United States Patent
Van Keulen et al.

(10) Patent No.: US 11,972,879 B2
(45) Date of Patent: Apr. 30, 2024

(54) METHOD OF SEALING OFF A CUT OFF END OF A SUBSEA CABLE SECTION

(71) Applicant: Baggermaatschappij Boskalis B.V., Papendrecht (NL)

(72) Inventors: Tim Van Keulen, Papendrecht (NL); Rob Rudolf Theodorus Oor, Papendrecht (NL); Emiel Van Weenen, Papendrecht (NL)

(73) Assignee: BAGGERMAATSCHAPPIJ BOSKALIS B.V., Papendrecht (NL)

( * ) Notice: Subject to any disclaimer, the term of this patent is extended or adjusted under 35 U.S.C. 154(b) by 0 days.

(21) Appl. No.: 17/045,639

(22) PCT Filed: Apr. 9, 2019

(86) PCT No.: PCT/NL2019/050211
§ 371 (c)(1),
(2) Date: Oct. 6, 2020

(87) PCT Pub. No.: WO2019/199164
PCT Pub. Date: Oct. 17, 2019

(65) Prior Publication Data
US 2021/0158993 A1    May 27, 2021

(30) Foreign Application Priority Data
Apr. 9, 2018   (NL) ..................... 2020736

(51) Int. Cl.
*H01B 13/32*   (2006.01)
*H01B 7/14*   (2006.01)
(Continued)

(52) U.S. Cl.
CPC ............. *H01B 7/2825* (2013.01); *H01B 7/14* (2013.01); *H01B 13/22* (2013.01); *H01B 13/32* (2013.01);
(Continued)

(58) Field of Classification Search
CPC ........ H01B 7/2825; H01B 7/14; H01B 7/282; H01B 13/22; H01B 13/32; H02G 15/003;
(Continued)

(56) References Cited

U.S. PATENT DOCUMENTS 3,590,139 A * 6/1971 Gillemot .............. H02G 15/043
174/74 A
4,070,543 A   1/1978 Thompson et al.
(Continued)

FOREIGN PATENT DOCUMENTS

CN   107968377 A   4/2018
GB   944546   12/1963
(Continued)

OTHER PUBLICATIONS

International Preliminary Report on Patentability dated Jul. 31, 2020, issued in corresponding International Application No. PCT/NL2019/050211 (17 pgs.).
(Continued)

*Primary Examiner* — Roshn K Varghese
(74) *Attorney, Agent, or Firm* — Pillsbury Winthrop Shaw Pittman, LLP

(57) ABSTRACT

While laying a subsea cable, an exposed cut off end of the cable is exposed to water prior to permanently sealing off this cable end. To prevent damage to the cable due to contact with the often salt water, due to for example oxidation, a temporarily watertight seal is to be applied to the cut off end. A method for applying this seal is provided which comprises applying a mouldable sealant to the exposed end wherein the sealant acts as a watertight barrier between the water and the cut off end of the cable. The sealant may comprise an intermediate layer between the cut off end and a watertight outer layer arranged to increase adhesion between the cut off end and the outer layer. This allows a broader range of outer
(Continued)

layer materials to be used as the outer layer material does not need to adhere directly with the cable.

26 Claims, 4 Drawing Sheets

(51) Int. Cl.
*H01B 7/282* (2006.01)
*H01B 13/22* (2006.01)
*H02G 15/00* (2006.01)
*H02G 15/04* (2006.01)

(52) U.S. Cl.
CPC ......... *H02G 15/003* (2013.01); *H02G 15/043* (2013.01)

(58) Field of Classification Search
CPC .... H02G 15/043; H02G 15/04; H02G 15/046; H02G 15/03; H02G 15/013; H02G 1/14; H02G 1/10; H01R 4/22
USPC ....................................................... 174/74 A
See application file for complete search history.

(56) References Cited

U.S. PATENT DOCUMENTS

| 4,356,343 | A | | 10/1982 | Larson | |
|---|---|---|---|---|---|
| 4,496,795 | A | * | 1/1985 | Konnik | .................. B32B 27/12 174/84 R |
| 4,863,535 | A | * | 9/1989 | More | ..................... H02G 15/18 174/76 |
| 2005/0268749 | A1 | * | 12/2005 | Schumacher | ........ H02G 1/1229 81/9.4 |
| 2014/0056648 | A1 | * | 2/2014 | Ahlen | ..................... H02G 1/16 405/184.1 |
| 2014/0060928 | A1 | * | 3/2014 | Skeet | .................. H02G 15/043 174/77 R |

FOREIGN PATENT DOCUMENTS

| GB | 2268005 A | 12/1993 |
|---|---|---|
| WO | 2013/033305 A1 | 3/2013 |
| WO | 2018/147026 A1 | 8/2018 |

OTHER PUBLICATIONS

International Search Report dated Sep. 19, 2019, issued in corresponding International Application No. PCT/NL2019/050211 (2 pgs.).

* cited by examiner

200

200

METHOD OF SEALING OFF A CUT OFF END OF A SUBSEA CABLE SECTION

CROSS-REFERENCE TO RELATED APPLICATIONS

This application is the U.S. National Phase of PCT/NL2019/050211, filed Apr. 9, 2019, which claims priority to Netherlands Patent Application No. 2020736, filed Apr. 9, 2018, the subject matter of each of which is incorporated herein by reference in its entirety.

FIELD OF THE INVENTION

The present invention relates to the field of sealing off ends of cables and subsea cables in particular.

BACKGROUND

During infield cable lay projects, subsea cables are cut to size. Exposed cut off ends of the subsea cables have to be made watertight. Current methods of sealing off require each core of the subsea cable to be sealed individually using hot or cold shrink end caps. Before the shrink end caps can be applied, the subsea cable has to be stripped for a certain length to expose the cores, and each core has to be cut to a certain length. Optionally, multiple additional protection layers are mounted over the end caps to protect the end caps, and the cores have to be bound together.

This current method, although it provides a watertight seal, is time consuming and requires a lot of workers to properly apply the seal. The method is also very sensitive to wrong handlings which may ruin the sealing off characteristics.

U.S. Pat. No. 4,070,543 discloses a re-enterable, waterproof, encapsulated splice assembly and method for electrical conductors. The splice enclosure utilizes a pair of deep, cupshaped housing members of supple material having a snug telescopic fit with one another about the splice junction. This junction is encapsuled in a water-repellent non-setting, gel-like potting compound charged into the inner end of the two cup-shaped members prior to their assembly.

GB944546 discloses a method of sealing the ends of cables sheathed with thermoplastic material comprising the steps of forming a pocket in one end or the ends of the cable and closing this pocket against outward movement of the conductors and ingress of water, without damaging the insulating or mechanical properties of the sheath. Granular material which includes granules of thermoplastic material is placed in the pocket and the granules of thermoplastic material are melted to form a plug which is bonded to the internal walls of the cable sheath. Normally the granular material will be a mixture of granules of thermoplastic material and a metallic or other conducting material.

GB2268005 discloses a method for creating a joint between lengths of cable using a mould which is filled with polypropylene composition under certain conditions of high temperature and pressure. The joint provides a conductive connection between two cores, one belonging to a first cable and another belonging to a second cable.

SUMMARY

The present invention inter alia aims to provide an alternative method for sealing off and preferably watertightly sealing off exposed cut off ends of subsea cables. An aim is to provide for such method which reduces time to watertightly seal off the subsea cable. An aim is to provide for such a method which reduces the chance of wrong handlings that may ruin the sealing off characteristics. An aim is to provide for such a method which does not require heating of the cable or parts thereof, which may require additional time, pose a danger, especially in offshore conditions, and/or require additional heating equipment. An aim is to provide for such a method which does not require splicing of the cable, as this process may be time consuming. The time reduction may especially be advantageous as while the sealing off procedure is performed, the entire cable lay project has to wait. Finally, the present invention may increase the quality of the watertight seal.

A subsea cable often comprises a plurality of cores and jackets, which are all contained within an outer jacket. A specific problem which may arise with cables comprising a plurality of cores and jackets is that one or more voids may be present between the different jackets within the outer jacket.

A first aspect of the present invention provides a method for watertightly sealing off an exposed cut off end of a subsea cable, with the subsea cable comprising a plurality of cores and jackets. The method comprises applying an at least partly mouldable sealant to the exposed cut off end of the subsea cable and allowing the sealant to cure or set such that the sealant is arranged to: prevent water from entering the cable and/or prevent water from contacting the cores.

This aspect provides a fast way of watertightly sealing off the exposed cut off end of the subsea cable, and may prevent the need to individually seal each core of the subsea cable. Furthermore, since the sealant is at least partly mouldable, the application of the sealant is relatively easy and may not require the use of special or expensive equipment. The sealant may furthermore be applied by a single worker, or by a smaller team of workers than with the method known in the art.

A cut off end of a subsea cable is created when a cable is cut in a direction substantially perpendicular to an elongation axis of the cable. Such a cut results in the exposure of a cut-off surface which is oriented substantially perpendicular to the elongation axis of the cable. Preferably, only this surface is exposed, and the jackets are further left intact as to substantially not expose any part of the circumferential outer surface of any cable. As such, the jackets comprised by the cable, including an outer jacket, substantially extend as far as the cores extend.

Preferably, the cut-off surface is substantially flat. This may for example increase the ease with which the sealant can be applied. Furthermore, a flat cut-off surface may be faster and/or easier to make, as only a single cut can suffice for creating the cut-off surface to which the sealant can be applied.

The sealant may be removed at a later stage for connecting adjacent cables for forming a transmission line for transporting electrical energy produce below, at or above sea level. Such electrical energy may be generated by means of solar power, wind power or from wave energy or tidal energy, using suitable equipment like solar panels, wind power generator or generated by means of any other natural resource or a combination of the aforementioned which natural resources may be obtained at sea and on a continental shelf in particular. For removing the sealant, either the sealant itself may be removed to re-expose the cut off end of the cable. Alternatively, the part of the cable to which is the sealant is connected may be cut off to expose a new cut off end of the cable.

In an embodiment of the method, applying the sealant comprises applying an intermediate layer comprising a first material to at least part of the exposed cut off end of the subsea cable and applying an outer layer comprising a second material to the intermediate layer, such that the intermediate layer is provided at least partly between the outer layer and the exposed cut off end of the subsea cable.

The intermediate layer may be arranged to prevent water from entering the cable and/or prevent water from contacting the cores. Preferably, the outer layer is arranged to prevent water from contacting the intermediate layer. When both the intermediate layer and the outer layer are arranged to prevent water from contacting the cores and/or entering the cable, an additional insurance of water tightness is provided which in turn decreases the possibility of a low quality watertight seal that may not be fully impermeable to water.

The first material may be a glue, polymer, resin, cement, or any combination thereof, and the second material may comprise a synthetic polymer. Optionally, prior to applying the sealant, the exposed cut off end of the subsea cable to which the sealant is to be applied may be cleaned to provide a better adhesion between the sealant and the exposed cut off end of the subsea cable.

An additional jacket, such as a Chinese finger, may be provided over an outer circumference of the cut-off end of the subsea cable and/or over at least part of the sealant, wherein the additional jacket may be arranged to radially clamp the subsea cable and the sealant.

A second aspect of the present invention provides a section of a watertight subsea cable comprising a plurality of jackets and cores, an exposed cut-off end, exposing at least part of the plurality of jackets and cores, and a layer of cured or set sealant applied to at least part of the exposed cut-off end, such that the layer of sealant is arranged to prevent water from entering the subsea cable through the exposed cut off end and/or contacting the cores.

Optionally, the layer of sealant comprises an outer layer and an intermediate layer, provide between the outer layer and the exposed cut off end of the subsea cable.

At least one of the intermediate layer and the outer layer may be arranged to prevent water from entering the cable and/or prevent water from contacting the cores; and the outer layer is preferably arranged to prevent water from contacting the intermediate layer.

BRIEF DESCRIPTION OF THE FIGURES

The various aspects and embodiments thereof will now be discussed in conjunction with drawings. In the drawings.

DETAILED DESCRIPTION OF THE FIGURES

Figure 1A:
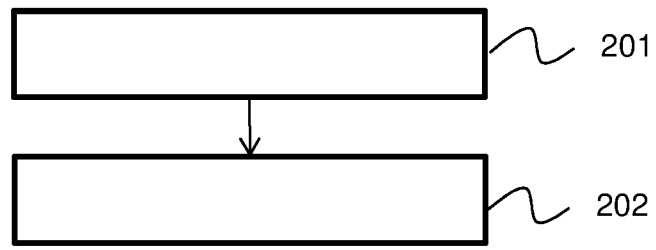
FIG. 1A shows a method for watertightly sealing off a subsea cable.

In this description a subsea cable should be understood as a cable arranged for providing a conduit, for example for a communication network or transfer of electrical power between two or more land based stations through a body of water, such as a sea, ocean or lake. In this description a mouldable sealant should be understood as at least meaning, but not limited to a substance which has a viscosity sufficiently high to be able to be brought into a desired shape, which shape is substantially retained by the substance during subsequent curing and/or setting of the sealant, even in a sub sea environment, below the water surface. Furthermore, the mouldable sealant may be understood as being malleable, meaning it is formable without breaking or cracking. Moulding can in this context mean forming into a desired shape by hand or using tooling, such as for example but not limited to using a mould. In such embodiment, the substance preferably has a viscosity low enough to provide the substance to the mould.

The mouldable sealant is preferable mouldable at ambient temperature, such that no additional heating is required for making the sealant mouldable. Ambient temperatures may fall within a range of −10 and 40 degrees C., preferably between −5 and 30 degrees C., even more preferably 5 and 20 degrees C.

A material that is "At least partly mouldable" should be understood as a material of which the volume it holds is mouldable, wherein the material, such as a suspension, may comprise solids which have a non-mouldable shape. A sealant should be understood as meaning at least, but not limited to, a material or material composition which is at least substantially impermeable to water, preferably impermeable to salt water, at least after setting or curing of the material, for at least an amount of time over which the sealant is under water during the laying of the subsea cable to which the sealant is applied.

The sealant is for example a suspension, solid, liquid, solution, emulsion optionally comprising an emulsifier, or a combination thereof, and may be in the form of a paste, liquid, aerosol, any other form or any combination thereof.

The mouldable sealant comprises for instance a bitumen or bitumen-based compound, an epoxy compound, a polyurethane compound, a polyester compound, a cyanoacrylate compound, or a polyolefin compound.

More in particular, various substances may be used as mouldable sealants, including, but not limited to bitumen based substances like Bison Rubber seal, Aquaplan Aquastop, Shell Seal & fix, 2 component epoxy substances including but not limited to Bison 2 k Epoxy flue, 3 m Scotch cast pouring resin, Baricol type A150, Bison Kombi Rapide, RKT Tholen—2 k resin, Akzo Nobel 2 k resin, polyurethane (PU) based compounds like Sikaflex 252, Illbruck FM330 PUR foam, Great Stuff™, such PU compounds optionally applied as a liquid gasket with an optional metal or plastic endcap, SPUR like Zwaluw Foliefix, a low surface tension material like Never Wet, hot melt glue applied in a hot state, an MS polymer like Zettex MS polymer, a viscoelastic polyester like Stopaq, a flame sprayed FSPE as provided by Plascoat, a 2 component polyolefin glue like Loctite AA 3038, 3M Scotchweld DP8005, or as provided by Pattex, firestop silicon sealant 700, maleic anhydride grafted polyolefin, a cyanoacrylate compound, other or a combination thereof.

Sealing off of a surface should be understood as at least meaning that those parts of the surface which are pervious to negative effects such as corrosion when being exposed to water are sealed off from being able to be contacted by water through the sealant. A jacket of a cable should be understood as a screen, strand screen, insulation screen, tape, sheath, or cover provided around a core of the cable or the cable itself arranged to for example insulate the core from contact with adjacent cores, to shield a magnetic field and/or provide grounding for a core.

FIG. 1A shows a method 200 for watertightly sealing off an exposed cut off end of a subsea cable. The method comprises applying a mouldable sealant 201 to the exposed cut off end of the subsea cable and allowing the sealant to cure or set 202 such that the sealant is arranged to: prevent water from entering the cable and/or prevent water from contacting the cores. The subsea cable comprises a plurality of cores and jackets.

The sealant is at least partially mouldable, such that it may be applied to the exposed cut off section for example by means of smearing, spraying, coating, and rubbing. To set the sealant in the shape in which it has been applied, the sealant is allowed to cure or set. If the sealant comprises a glue, curing means that the glue is set or hardened, such that the glue is substantially not mouldable any more without plastically deforming the glue. Such glue may be solvent based, hot melt glue, two component resin based glue, other, or a combination thereof.

If the sealant comprises a foam, curing implies that the foam is hardened or set into a substantially solid material. In the context of the present invention, to set means to become firm or solid due to drying or a physical or chemical reaction. Setting or curing may be triggered and/or stimulated by exposure of the sealant to moisture, heat, cooling, light of a specific wavelength such as ultraviolet light, another material, by polymerisation or crosslinking, any other chemical reaction or any combination thereof.

The application of the sealant may be done through for example but not limited to smearing, coating, spraying, spreading and/or dipping the exposed cut off end of the subsea cable in a container of sealant, any other application method or any combination thereof.

The curing or setting of the sealant may happen by virtue of evaporation of a component of the sealant, a chemical reaction, for example with air or components comprised by air, any other curing of setting mechanism, or any combination thereof. Heating the sealant beyond an ambient temperature may thus not be required, and thus no external heat source may be required. The ambient temperature here refers to the temperature of the surroundings of the sealant, and is thus dependent on weather and climate conditions.

Figure 1B:
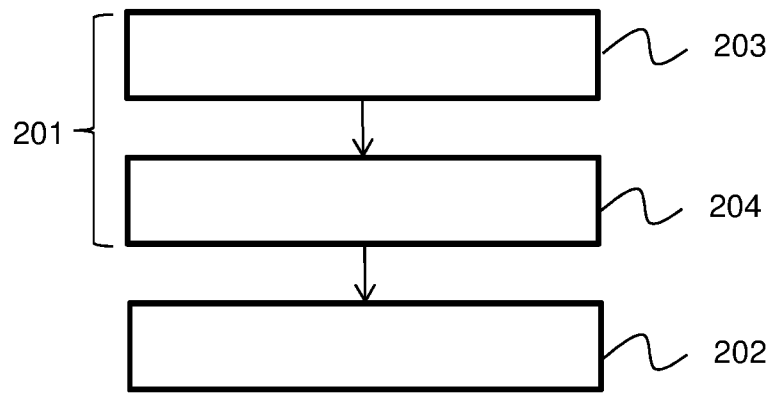
FIG. 1B shows another embodiment of the method for watertightly sealing off a subsea cable.

FIG. 1B shows an embodiment of the method 200, wherein applying the sealant 201 comprises applying an intermediate layer 203 comprising a first material to at least part of the exposed cut off end of the subsea cable and applying an outer layer 204 comprising a second material to the intermediate layer, such that the intermediate layer is provided at least partly between the outer layer and the exposed cut off end of the subsea cable. Embodiments of the method 200 wherein applying the sealant 201 comprises a plurality of intermediate layers are also envisioned. Each layer in the plurality of intermediate layers may comprise different materials, such as solids or mouldable materials, foils and may be arranged for different functionalities such as providing adhesion between adjacent layers or provide a watertight seal.

Prior to applying the sealant 201, the method may comprise cleaning of at least part of the exposed cut off section of the subsea cable. The cleaning may remove substances which may negatively affect adhesion of the sealant to the exposed cut off section, such as dirt, grease, moisture, any other contaminant or any combination thereof.

Figure 2A:
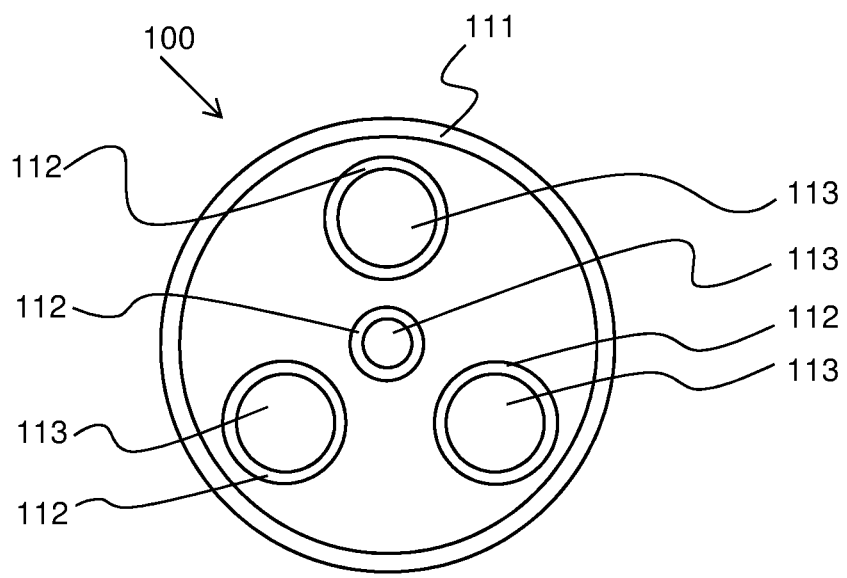
FIG. 2A shows a cross section of an exposed cut off section of a subsea cable.

FIG. 2A shows an exposed cut off section 101 of a subsea cable 100, wherein the subsea cable 100 comprises a plurality of jackets 112 and cores 113. The subsea cable 100 may comprise an outer jacket 111. The subsea cable 100 as shown in FIG. 2A is an example of a subsea cable 100 and comprises four cores 113, wherein the cores 113 are surrounded by jackets 112. A subsea cable 100 may comprises any number of cores 113 and jackets 112, and cores 113 may be provided with or without individual jackets 112. The cores 113 may comprise any conducting material, such as copper for conducting electricity and fiberglass for conducting light waves.

In the present invention the sealant is preferably provided such that the sealant primarily connects to and seals relative to the exposed ends of the jackets 112 of the cores 113, such that ingress of water in between the respective cores and their individual jackets is prevented. The sealant can also connect to the cores 113 themselves and/or to the outer jacket 111 and/or to the exposed filler material between the individual cores cq jackets 112 and the outer jacket 111. This will improve keeping the sealant attached. Even though water may ingress through the outer jacket 111 and possibly even into the filler material, the sealing against the exposed ends of the jackets 112 will provide for a proper seal of the relevant parts of the cables, the cores 113.

The sealant material of composite preferably is chosen such that it has optimal properties for adhering to and sealing against the material of the jackets 112.

Furthermore, the cores 113 and the jackets 112 may have different diameters and/or thicknesses. A typical diameter for a subsea cable may be between 10 mm and 400 mm, between 30-300 mm, between 50-200 mm, or between 75-100 mm. Larger or smaller diameters may be used as well for subsea cables. A cross-sectional shape of a subsea cable need not be perfectly circular, e.g. an oval cross-sectional shape may be used as well. The diameter of such a shape refers to the largest width displayed by the cross-sectional shape.

The exposed cut off section 101 of the subsea cable 100 may be created by cutting or sawing the subsea cable 100 at a pre-determined position. Although not shown in FIG. 2A, the subsea cable 100 may also be provided with one or more additional layers, such as polyester films, stranded steel wires, and water barriers, all of which may be used to enhance favourable properties of the subsea cable 100, such as tensile strength and resistance to oxidation and/or short-circuit. The additional layers, the outer jacket 111 and the jackets 112 may comprise materials such as synthetic polymers such as polyethylenes, polycarbonates, polyurethanes and polyesters, metals such as aluminium, copper, iron and brass, yarns for example comprising hemp or nylon and optionally mixed with tar, petroleum jellies, silicon gels, any other material or any combination thereof. A filler material may be provided between the outer jacket 111 and the cores and jackets.

When the subsea cable 100 as shown in FIG. 2A is placed into a body of water, such as for example salt seawater, water may enter the subsea cable 100 through the exposed cut off end 101 and water may contact the cores 112. A filler material may be provided between the outer jacket 111 and the cores and jackets. The water entering the subsea cable 100 may cause oxidation and/or degradation of components provided in the subsea cable 100, and water contacting the cores 112 may cause oxidation and/or degradation of the cores. Both these effects may severely negatively affect the working of the subsea cable.

Figure 2B:
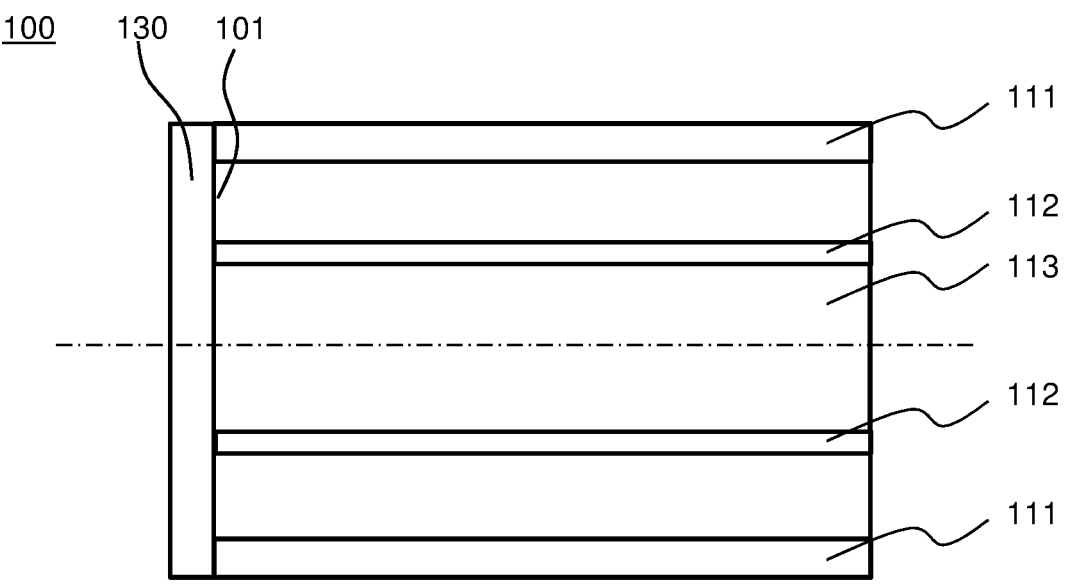
FIG. 2B shows a section view of the subsea cable.

FIG. 2B shows a section view of the subsea cable 100, wherein the subsea cable 100 is for simplicity shown comprising one core 113 which is surrounded by one jacket 112.

The subsea cable 100 further comprises a sealant 130. The sealant 130 is applied to the exposed cut off section 101, and is arranged to at least one of: prevent water from entering the cable 100 through the exposed cut off section 101 and prevent water from contacting at least one of the cores 113 comprised by the subsea cable 100.

Figure 2C:
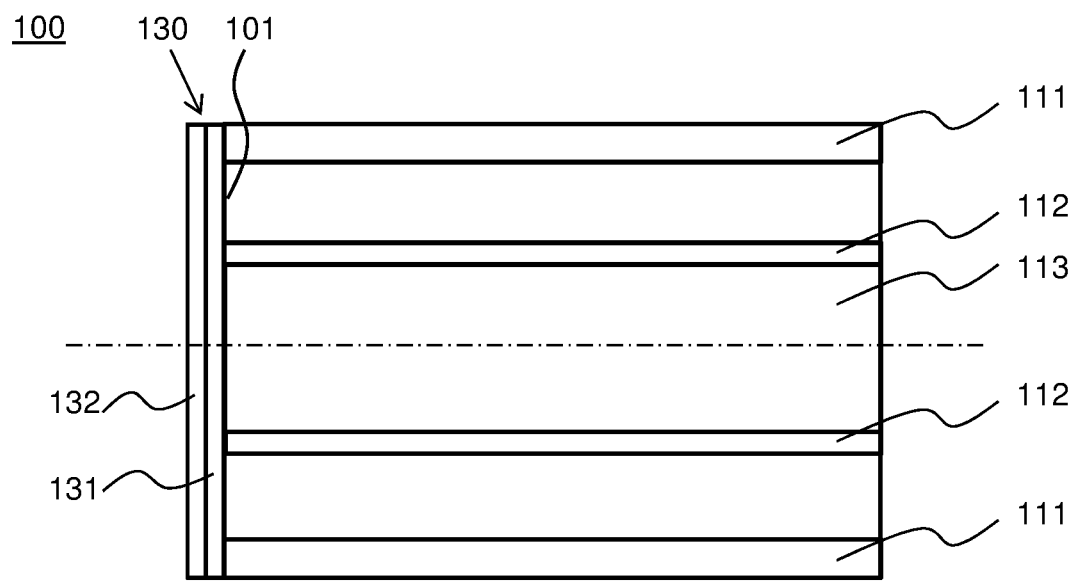
FIG. 2C shows another section view of the subsea cable.

FIG. 2C shows an embodiment of the subsea cable 100 comprising the sealant 130 applied to the exposed cut off section 101. In this embodiment, the sealant 130 comprises an intermediate layer 131 and an outer layer 132.

The intermediate layer 131 is applied to at least part of the exposed cut off section 101, and comprises a first material. The outer layer 132 is applied to at least part of the intermediate layer 132, and comprises a second material. In different embodiments of the sealant 130, the intermediate layer 131 and the outer layer 132 may be arranged to provide different functionalities, as will by way of example, but in non limiting fashion, be described here after. Various compounds may be used for the intermediate layer 131, depending on the desired functionality or effect, and depending on the material or materials comprised by the mouldable sealant on one hand and material or materials comprised by the exposed cut off section 101.

Compounds that may be used are, without limitation, cyanoacrylate compounds, a polyethylene primer or another primer comprising, without limitation, heptane or other alkanes, aliphatic amines, other, or a combination thereof. Such primer may be used to make polyolefin and other low energy surfaces suitable for bonding with cyanoacrylate adhesives; this is particular suitable for polyethylene, polypropylene, polytetrafluoroethylene (PTFE) and thermoplastic rubber materials that may be used for jackets of cables.

The first material comprised by the intermediate layer 131 comprises or consists (essentially) of for example a glue, polymer, resin, cement. The first material is for instance arranged to bond and preferably covalently bond, for example by means of compatible reactive groups, to the second material comprised by the outer layer 132 and one or more materials provided at the exposed cut off end 101 of the subsea cable 100, such as material comprised by the outer jacket 111, cores 113, jackets 112, and optional filler material. The use of this intermediate layer 131 would thus allow choosing the second material comprised by the outer layer 132 from a set of materials that would not adhere sufficiently to the one or more materials provided at the exposed cut off end 101 of the subsea cable 100.

Optionally, or additionally to being arranged to bond to the second material and one or more materials provided at the exposed cut off end 101, the intermediate layer 131 may be arranged to prevent water from entering the cable 100 through the exposed cut off section 101 and/or prevent water from contacting the cores 113. In such an embodiment, the outer layer 132 may be arranged to prevent water from contacting the intermediate layer 131. This configuration lowers a demand for the first material comprised by the intermediate layer 131 to be impervious to water, as water is prevented to contact the intermediate layer 131 by virtue of the outer layer 132. Alternatively or additionally the intermediate layer 131 can be a water impermeable layer, whereas the outer layer 132 can be a protective layer which does then not necessarily have to be water tight, but can for example provide for a higher impact resistance or be better resistant against wear and tear.

Prior to applying the outer layer 132 to the intermediate layer 131, the intermediate layer 131 may be applied to at least part of the exposed cut off section 101 of the subsea cable 100. A pre-determined amount of time may be provided between the application of the intermediate layer 131 and the outer layer 132 to allow the intermediate layer 131 to cure, harden or set. This amount of time may depend on properties of the first material comprised by the intermediate layer 131, properties of the second material comprised by the outer layer 132 and environmental conditions such as temperature, pressure and humidity. Not providing sufficient time between the application of the intermediate layer 131 and the outer layer 132 may result in a lower quality of adhesion and/or watertightness between the intermediate layer 131 and at least part of the exposed cut off end 101, the intermediate layer 131 and the outer layer 132, or both. Additionally or alternatively materials comprised by the intermediate layer 131 and the outer layer 132 may interact with each other, for example for initiating or improving curing or setting thereof.

Figure 2D:
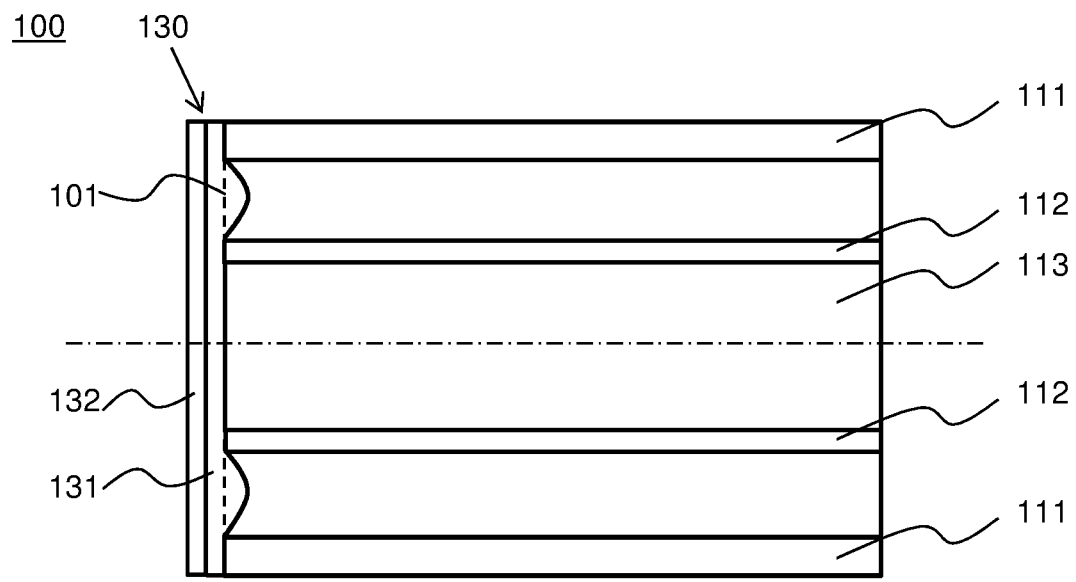
FIG. 2D shows another section view of the subsea cable.

Now referring to FIG. 2D, in an embodiment of the subsea cable 100, part of the exposed cut off section 101 on which the sealant 130 may be applied may comprise one or more voids where for example no core, jacket, or filler material is provided. In such an embodiment of the subsea cable 100, the sealant 130 may be applied not only on the surface, but also at least partly into the voids as shown in FIG. 2D as to prevent water from entering the subsea cable 100 through the voids.

Prior to applying the intermediate layer 131 to the exposed cut off section 101 of the subsea cable 100, the exposed cut off section 101 may be cleaned to increase adhesion of the intermediate layer 131 to the exposed cut off section 101. Similarly, prior to applying the outer layer 132 to the intermediate layer 131, the part of the intermediate layer 131 to which the outer layer 132 will be applied may be cleaned. With cleaning, dirt, grease, moisture, any other contaminant which may negatively affect adhesion, or any combination thereof may be removed.

Figure 2E:
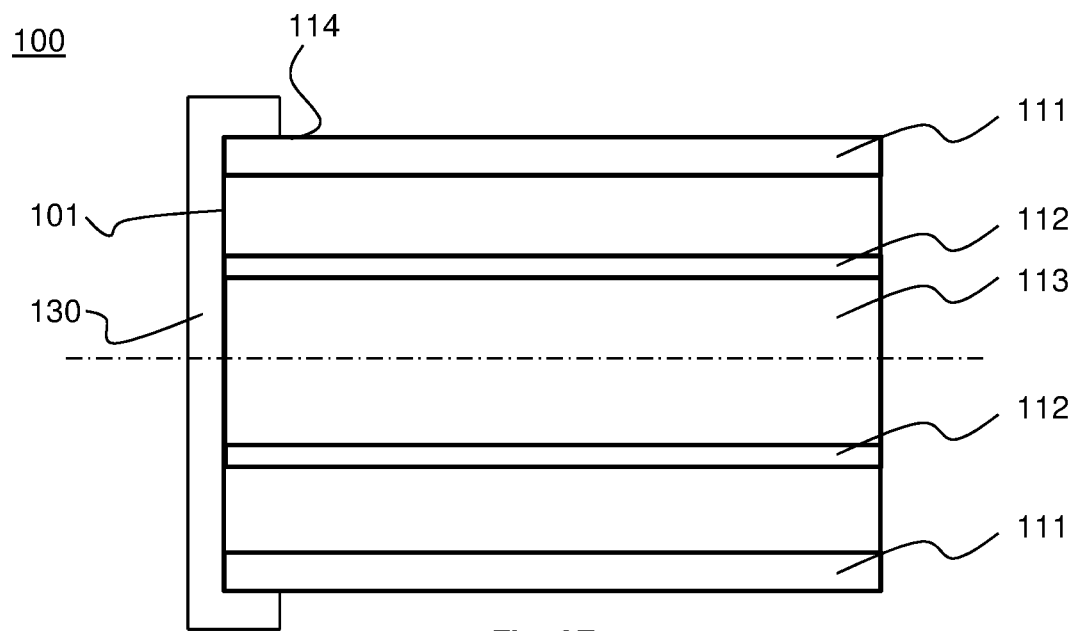
FIG. 2E shows another section view of the subsea cable.

FIG. 2E shows a section view of another the subsea cable 100 wherein the sealant 130 is applied not only to the exposed cut off end 101 of the subsea cable 100, but also on a part of an outer circumference 114 of the subsea cable 100, on an outside of the outer jacket 111. In the embodiment of the subsea cable 100 as shown in FIG. 2E, the sealant 130 thus covers the exposed cut off end 101 of the subsea cable 100, an exposed cut off end of the outer jacket 111, and a part of the outer circumference 114 of the subsea cable 100. This may even better prevent water from entering the subsea cable 100. The embodiment as shown in FIG. 2E may also comprise one or more layers, such as the intermediate layer 131 and outer layer 132. One or both of these one or more layers may be provided at least partially on a part of the outer circumference 114.

Figure 2F:
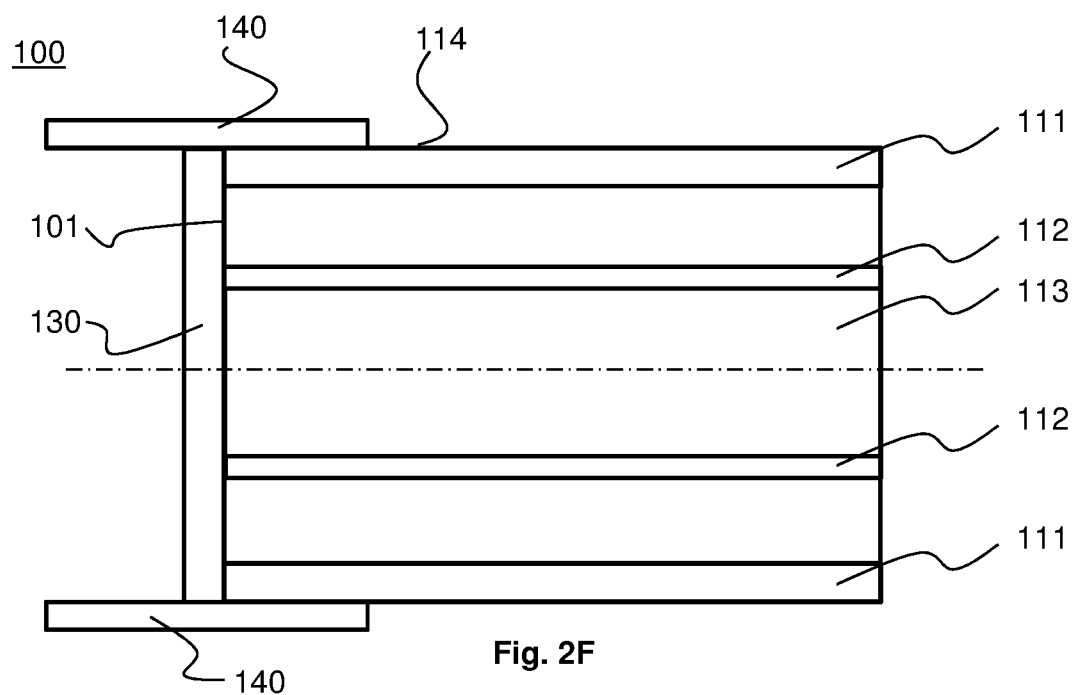
FIG. 2F shows another section view of the subsea cable with an additional jacket.

FIG. 2F shows an embodiment of the subsea cable 100 comprising the sealant 130 and additionally comprising an additional jacket 140. The additional jacket 140 is arranged to radially clamp the subsea cable 100 and the sealant 139, wherein the sealant 130 may be provided partially on the outer circumference 114 of the subsea cable 100. Optionally, the additional jacket 140 is also arranged to act as a pull mount for the subsea cable 100. The additional jacket 140 may be arranged as a Chinese finger, wherein a Chinese finger is a term used to describe a trap-device arranged to convert an axial pull force into a radial compression force. The Chinese finger is a tubular shaped mesh of strands braided such that an axial pull to the mesh of strands results in an axial elongation of the Chinese finger and a corresponding decrease in radius. The decrease in radius may result in the radial compression force.

After the sealant 130 had been applied to the exposed cut off end 101 of the subsea cable 100, the additional jacket 140 may be slid over the exposed end of the subsea cable 100. Alternatively, the additional jacket 140 may be provided over the circumference of the subsea cable 100 and fastened. The fastening may allow the additional jacket 140 to, while fastened, provide a radial compression to at least one of the subsea cable 100 and the sealant 130.

The additional jacket 140 may be used as an anchor to pull the subsea cable 100 with less damage than would occur when the subsea cable 100 itself is pulled.

In summary, while laying a subsea cable, an exposed cut off end of the cable is exposed to water prior to permanently sealing off this cable end. To prevent damage to the cable due to contact with the often salt water, due to for example oxidation, a temporarily watertight seal is to be applied to the cut off end. A method for applying this seal is provided which comprises applying a mouldable sealant to the exposed end wherein the sealant acts as a watertight barrier between the water and the cut off end of the cable. The sealant may comprise an intermediate layer between the cut off end and a watertight outer layer arranged to increase adhesion between the cut off end and the outer layer. This allows a broader range of outer layer materials to be used as the outer layer material does not need to adhere directly with the cable.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described. The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method for watertightly sealing off an exposed cut off end of a subsea cable, the subsea cable comprising a plurality of cores and jackets contained within an outer jacket, the method comprising:

applying an at least partly mouldable sealant to the exposed cut off end of the subsea cable, the at least partly mouldable sealant being mouldable at ambient temperature; and allowing the at least partly mouldable sealant to cure or set such that the at least partly mouldable sealant is arranged to prevent water from entering the subsea cable and/or prevent water from contacting the plurality of cores;

wherein the at least partly mouldable sealant connects to and seals exposed ends of the jackets, and wherein the at least partly mouldable sealant is allowed to cure or set such that after curing or setting, a shape of the sealant is retained even in a sub sea environment, below a surface of the water.

2. The method according to claim 1, wherein the applying the at least partly mouldable sealant comprises:

applying an intermediate layer comprising a first material to at least part of the exposed cut off end of the subsea cable; and applying an outer layer comprising a second material to the intermediate layer, such that the intermediate layer is provided at least partly between the outer layer and the exposed cut off end of the subsea cable.

3. The method according to claim 2, wherein at least one of the intermediate layer and the outer layer is arranged to prevent water from entering the subsea cable and/or prevent water from contacting the plurality of cores.

4. The method according to claim 3, wherein the outer layer is arranged to prevent water from contacting the intermediate layer.

5. The method according to claim 2, wherein the intermediate layer is arranged to bond with:

a material comprised by the jackets of the subsea cable; and the second material comprised by the outer layer.

6. The method according to claim 2, wherein the first material is a glue, resin, cement, or any combination thereof.

7. The method according to claim 2, wherein the second material comprises a synthetic polymer or a biopolymer.

8. The method according to claim 1, further comprising:

prior to applying the at least partly mouldable sealant, cleaning the exposed cut off end of the subsea cable to which the at least partly mouldable sealant is to be applied.

9. The method according to claim 1, further comprising:

after the at least partly mouldable sealant has been applied, providing an additional jacket over an outer circumference of the cut-off end of the subsea cable and/or over at least part of the at least partly mouldable sealant.

10. The method according to claim 9, wherein the additional jacket is arranged to radially clamp the subsea cable and the at least partly mouldable sealant.

11. The method according to claim 9, wherein the additional jacket comprises a tubular shaped mesh of strands braided such that an axial pull force applied to the mesh of strands results in an axial elongation thereof and a corresponding decrease in radius of the mesh of strands.

12. The method according to claim 11, wherein the additional jacket is used as an anchor to pull the subsea cable.

13. The method according to claim 1, wherein the at least partly moldable sealant also connects to an end face of the outer jacket.

14. The method according to claim 1, wherein the method comprises:
providing the exposed cut off end of the subsea cable by cutting a subsea cable at sea prior to applying the at least partly mouldable sealant.

15. The method according to claim 1, further comprising removing the at least partly mouldable sealant by removing the at least partly mouldable sealant itself or by cutting off the part of the cable to which the at least partly mouldable sealant is connected.

16. The method according to claim 1, wherein the at least partly mouldable sealant is applied to the exposed cut off end by means of smearing, spraying, coating, rubbing spreading, and/or dipping by dipping the exposed cut off end of the subsea cable in a container of sealant.

17. A watertight subsea cable section, comprising:
a plurality of jackets and cores contained within an outer jacket;
a cut-off end formed by cutting the subsea cable in a direction substantially perpendicular to an elongation axis of the subsea cable, such that a cut-off surface is oriented perpendicular to the elongation axis of the subsea cable and the plurality of jackets of the cable, including the outer jacket, extend as far as the cores extend, the cut-off end exposing at least part of the plurality of jackets and cores; and
a layer of sealant applied to exposed ends of the plurality of jackets and cores, the sealant being cured or set such that a shape of the sealant is retained even in a sub sea environment, below a surface of the water and such that the layer of sealant is arranged to prevent water from contacting the cores, said sealant being mouldable at ambient temperature and connected to and sealing the exposed ends.

18. The watertight subsea cable section according to claim 17, wherein the layer of sealant comprises:
an outer layer; and
an intermediate layer provided between the outer layer and the cut off end of the subsea cable section.

19. The watertight subsea cable section according to claim 18, wherein at least one of the intermediate layer and the outer layer is arranged to prevent water from entering the subsea cable section and/or prevent water from contacting the cores.

20. The watertight subsea cable section according to claim 19, wherein the outer layer is arranged to prevent water from contacting the intermediate layer.

21. The watertight subsea cable section according to claim 18, wherein the intermediate layer comprises at least one of: a glue, a resin, and cement, and wherein the intermediate layer is arranged to bond with:
a material comprised by the plurality of jackets; and
a second material comprised by the outer layer.

22. The watertight subsea cable section according to claim 18, wherein the outer layer comprises a synthetic polymer.

23. The watertight subsea cable section according to claim 17, further comprising an additional jacket arranged to radially clamp the subsea cable section and the layer of sealant.

24. A method for watertightly sealing off an exposed cut off end of a subsea cable, the subsea cable comprising a plurality of cores and jackets contained within an outer jacket, the method comprising:
cutting the subsea cable in a direction substantially perpendicular to an elongation axis of the subsea cable to create the exposed cut off end, such that a cut-off surface is oriented perpendicular to the elongation axis of the subsea cable and the jackets of the cable, including the outer jacket, extend as far as the plurality of cores extend;
applying an at least partly mouldable sealant to the exposed cut off end of the subsea cable, the at least partly mouldable sealant being mouldable at ambient temperature; and
allowing the at least partly mouldable sealant to cure or set such that the at least partly mouldable sealant is arranged to prevent water from entering the subsea cable and/or prevent water from contacting the plurality of cores;
wherein the at least partly mouldable sealant connects to and seals exposed ends of the jackets.

25. The method according to claim 24, wherein the cutting of the subsea cable results in the cut-off surface and only the cut-off surface is exposed, such that the jackets are further left intact as to not expose any part of a circumferential outer surface of any core of the plurality of cores.

26. A method for watertightly sealing off an exposed cut off end of a subsea cable, the subsea cable comprising a plurality of cores and jackets contained within an outer jacket, the method comprising:
cutting the subsea cable, forming the exposed cut off end, such that of the plurality of cores only an exposed axial end is visible, in an axial exposed cut off end,
applying an at least partly mouldable sealant to the exposed cut off end of the subsea cable, the at least partly mouldable sealant being mouldable at ambient temperature, such that the at least partly mouldable sealant is arranged to prevent water from entering the subsea cable and/or prevent water from contacting the plurality of cores;
wherein the at least partly mouldable sealant connects to and seals exposed ends of the jackets, and wherein the at least partly mouldable sealant is allowed to cure or set such that after curing or setting, a shape of the sealant is retained even in a sub sea environment, below a surface of the water.

\* \* \* \* \*